US008028982B2

(12) United States Patent
Gorp et al.

(10) Patent No.: US 8,028,982 B2
(45) Date of Patent: Oct. 4, 2011

(54) METHOD AND SYSTEM FOR SIMULTANEOUSLY PROCESSING LETTERS AND FLAT MAIL

(75) Inventors: Mark Van Gorp, Cary, NC (US); Brian Richardson, Haw River, NC (US)

(73) Assignee: Bell and Howell, LLC, Durham, NC (US)

( * ) Notice: Subject to any disclaimer, the term of this patent is extended or adjusted under 35 U.S.C. 154(b) by 95 days.

(21) Appl. No.: 12/534,485

(22) Filed: Aug. 3, 2009

(65) Prior Publication Data

US 2011/0029126 A1 Feb. 3, 2011

(51) Int. Cl.
*G06F 17/00* (2006.01)

(52) U.S. Cl. ..................... 270/58.06; 705/401; 705/406; 53/284.3; 53/569; 53/381.5

(58) Field of Classification Search ............... 270/58.06; 705/401, 406; 53/284.3, 569, 381.5
See application file for complete search history.

(56) References Cited

U.S. PATENT DOCUMENTS

| | | | | |
|---|---|---|---|---|
| 5,493,500 | A * | 2/1996 | Boorsma | 705/406 |
| 7,610,248 | B1 * | 10/2009 | Nowlin et al. | 705/401 |
| 7,644,004 | B2 * | 1/2010 | Guyett et al. | 705/1.1 |
| 2003/0088512 | A1 * | 5/2003 | Hoter-Ishay | 705/40 |
| 2004/0088267 | A1 * | 5/2004 | Rasmussen et al. | 705/407 |
| 2005/0075990 | A1 * | 4/2005 | Ogg | 705/406 |

* cited by examiner

*Primary Examiner* — Patrick Mackey

(74) *Attorney, Agent, or Firm* — McDermott Will & Emery LLP

(57) ABSTRACT

The present teachings relate to techniques and equipment to insert documents into either letter envelopes or flat mail envelopes on the same dual mode mailing inserter without the need to do machine setup between letter and flat mail envelope insertion. The dual mode mail inserting machine is configured to accept documents from a printer that are designed for insertion into flat mail envelope. If a document plus its inserts and envelope weighs less than a predetermined weight, the document will be diverted from the normal flat mail path to a second inserter and output section.

20 Claims, 3 Drawing Sheets

METHOD AND SYSTEM FOR SIMULTANEOUSLY PROCESSING LETTERS AND FLAT MAIL

TECHNICAL FIELD

The present subject matter relates to techniques and equipment to insert documents into either letter envelopes or flat mail envelopes on the same inserter without the need to do machine setup between letter and flat mail envelope insertion.

BACKGROUND

Current mail inserting machines are designed to run either letter size mail or flat sized mail. Some inserting machines can run both letter and flat mail but the machine must be stopped and setup parameters changed to switch between envelope types. Letter and flat mail properties are defined by the postal authority such as the USPS®. The properties include envelope size, weight and postage requirements. Generally the USPS charges less postage for letter mail than flat mail of similar weight due to reduced processing costs associated with letter mail. For example, under current USPS first class postage rates, a 3.4 ounce flat mail envelope will cost $1.39 while a similar letter will cost $0.95. Significant postage savings can be achieved if qualifying flat mail could be converted to into the letter format.

There is an additional problem associated with designing a machine to insert documents configured for insertion into flat mail envelopes. Typically the addressee and address are printed on page one of the document so that the addressee and address will be visible through a window in the envelope after the document is inserted. If the document is inserted into a letter envelope the addressee and address will not be oriented to enable this data to be visible through a window.

Hence a need exists for a dual mode mail inserting machine that can run flat mail but be able to convert documents designed in a flat mail format into a letter format using a sub-set accumulator to direct documents that are less than a predetermined weight to a folder and letter inserter. The addressee and address data must be read from the document or looked up in an insertion definition file before insertion of the document into a letter envelope. The address block data is then printed on the letter envelope and verified with an imaging system for quality assurance.

SUMMARY

The teachings herein alleviate one or more of the above noted problems with a dual mode letter and flat mail insertion machine. The dual mode mail inserting machine will accept documents from a printer that are designed for insertion into flat mail envelope. If a document plus inserts and envelope weighs less than a predetermined weight, the document will be diverted from the normal flat mail path to a second inserter and output section. In the second output section, the document is folded and inserted into a letter envelope. Before the document is folded and inserted into the letter envelope, the address block data is read from the document. Following the insertion the address block data is printed on the envelope.

One aspect presented herein relates to a method for processing a plurality of mail documents on a dual mode inserter. The method includes receiving mail documents at an input section of the dual mode inserter. A weight is determined for a first mail document and second mail document. The weight of the first mail document is less than the weight of the second mail document. The first mail document is diverted to a letter output system and the second mail document to a flat output system based on respective weight of the first and second mail documents, without stoppage of the dual mode inserter. The second mail document is inserted into a flat envelope. The address data from the first mail document is obtained and the first mail document is folded. The folded first mail document is inserted into a letter envelope.

It is also desirable to provide a method for processing a plurality of mail documents on a dual mode inserter. The method includes the loading of mail documents at an input end of the dual mode inserter. Job control information is accessed for each mail document. The job control information is in electronic format and includes at least one of weight, page count or address data associated with each mail document. A first mail document is diverted to a letter output system and a second mail document to a flat output system based on the accessed weight data of the first and second mail documents without stoppage of the dual mode inserter. The weight of the first mail document is less than the weight of the second mail document. The first mail document is inserted into a letter envelope and the second mail document into a flat envelope. The method includes forwarding updated postal authority documentation from the original mailing to represent letter and flat mailings.

In yet another aspect is a dual mode inserter system. The system includes an input section configured to receive mail documents and a transport path for conveying the mail documents. A controller is configured to determine a weight of a first mail document and second mail document. The system includes a sub-set accumulator that is configured to divert the first mail document to a letter output system and the second mail document to a flat output system based on respective weight of the first and second mail documents. The weight of the second mail document is greater than the first mail document. The letter output system includes at least an address or barcode reader for reading data from a mail document and a printer for printing address information on an envelope.

Additional objects, advantages and novel features will be set forth in part in the description which follows, and in part will become apparent to those skilled in the art upon examination of the following and the accompanying drawings or may be learned by production or operation of the examples. The objects and advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Figure 1:
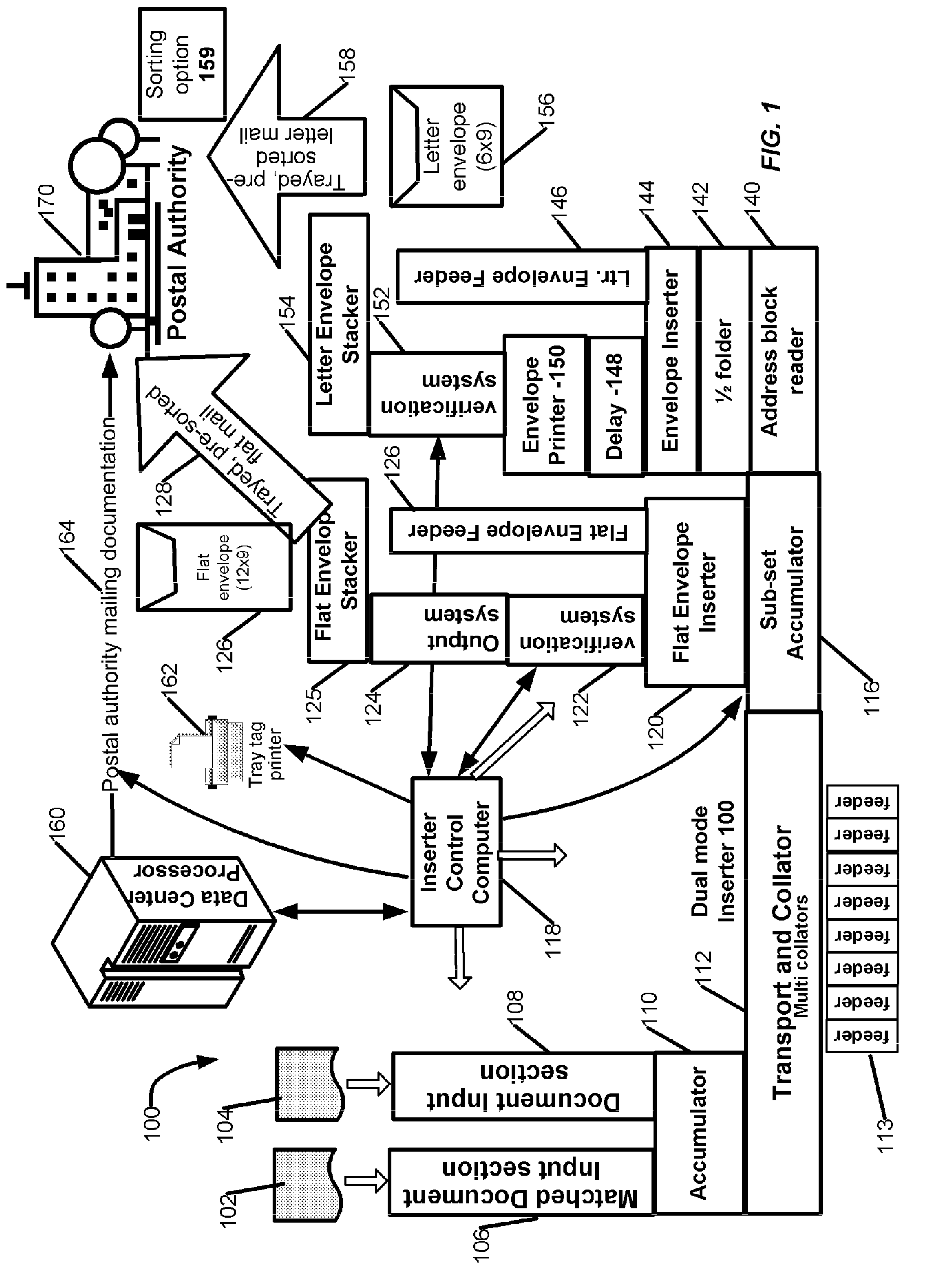
FIG. 1 is an exemplary inserter and accompanying data processing system configured for a dual letter and flat envelope inserter

Reference now is made in detail to the examples illustrated in the accompanying drawings and discussed below. Reference is now made to FIG. 1 to explain the operation of the dual mode, letter and flat envelope inserter system 100. The dual mode inserter 100 illustrated in FIG. 1 is a dual document input section 106, 108, a single transport and collator 112 and two inserter sections 120, 144. The flat envelope and ½ fold letter envelope is illustrated by 126 and 156 respectively. Other size envelopes maybe used for flats and letters provided they meet the postal authority requirements and are within the design range of the inserter. All sections of the inserter are controlled by the inserter control computer 118. Two sets of documents 102, 104 are fed into the document input sections 106, 108. For example, documents 104 are the large page count statements and documents 102 are one or two pages such as a check. The matched document input section 106 must add the correct check 102 with the correct statement 104 in the accumulator 110. The accumulation function may also occur in the transport and collator 112. The transport and collator 112 receives inserts from the insert feeders 113 and collates them with the check and document to form the group of items to be inserted into an envelope. The sub-set accumulator 116 receives the group of items for insertion. The sub-set accumulator 116, under control of the inserter control computer 118, directs the group of items to either the flat envelop inserter 120 or to the half folder 142 based on calculated weight of the group of items. The flat output system consists of items 116, 120, 122, 124, 125 and 126 and the letter output system consists of items 116, 140, 142, 144, 146, 148, 150, 152 and 154. The dual mode inserter 100 illustrated in FIG. 1 is exemplary in nature and not intended to limit the machine configuration for those skilled in the art. For example, but not limited to, the document input section 108 can be one or more subsystems containing cutters, accumulators and folders, resulting in processing one or more sets of documents 104 either independently or matched. The transport and collator 112 may be one or more channels that transport documents and inserts in a vertical or horizontal orientation. Similarly, there are numerous viable configurations for the flat and letter output subsystems may combine the common subsystems but still use separate letter 146 and flat 126 envelope feeders.

The inserter control computer 118 has calculated weight for each group of items since it has controlled the accumulation of a known number of pages in the statement plus the number of pages in the matched document, if two input channels are used, and the number of inserters that were added. The inserter control computer 118 receives job information from the data center processor 160, often in the form of an Insertion Definition File (IDF). This file may contain the weight associated with each group of items or an instruction as to which group of items should be processed as a letter. Alternately, a barcode reader located before the sub-accumulator may read a control barcode that defines the contents to be inserted as part of the current accumulated group of items or material. Since the page and insert count is known from the barcode data, the weight of the finished mailpiece can be calculated. Due to postal authority requirements all groups of items less than 3.5 ounces can be mailed as a letter provided the folded items are less than ½ inch thick. Those skilled on the art may design numerous methods to determine the weigh of the group of items through calculations in various stages of production and may add a scale to weigh the group of items. The weight and envelope size requirements to distinguish letter mailpieces from flat mailpieces are subject to change by the postal authority. The dual mode inserter 100 will be configured to process documents in accordance with the requirements.

If the group of items is to be processed as a letter, the address block data must be read either in the sub-set accumulator 116 or in a separate section address reader section 140. Alternately, the address block data may be obtained by tracking the group of items through the inserter 100 and associating the group of items with a specific address block data set provided by the inserter control computer 118 using data contained in the insertion definition file (IDF). Instead to tracking the group of items through the inserter, a barcode reader can be used to read a control barcode that contains a unique reference number that is used to obtain the address block data from data in the inserter control computer 118. The address block data may contain, but is not limited to the postal authority barcode, address, addressee, key line, address change service request and customer barcode and sequence numbers. Some or all of these address block items maybe printed on the letter envelope. As known by those skilled in the art, the address block reader 140 contains an imaging system plus OCR to read contextual data and a barcode reader to read postal authority or customer barcodes. An envelope printer 150 is used to print addressee, address and postal authority barcode plus any other data items required by the customer or postal authority. A delay transport 148 maybe required if sufficient latency processing time is not available for completion of reading of the address block data before the group of items has transitioned the folder 142 and inserter 144 and arrived at the printer 150. Alternately, the barcode and address block data may be in the IDF and associated with the letter group of items by the inserter control computer 118. The IDF data would be used to control the envelope printer 150 instead of information read off of the document. The letter group of items will be inserted into a 6 by 9 inch envelope for the envelope feeder 146. A verification system 152 follows the letter envelope printer to verify that the printed address block data is correct for the letter mailpiece. The verification results are reported to the data center processor 160 either directly of via the inserter control computer 118. The letter verification information is combined with the verification system 122 data collected following the flat envelope inserter 120. The output section 124 maybe a transport or the location for one or more postage meters.

The verification data received from the verification systems 122, 152 is used to update or create the postal authority mailing documentation 164 a, such as the Mail.dat and Mail.xml electronic formats currently approved by USPS. The creation of the letter mailing and flat mailing postal authority mailing documentation 164 can be created in the data center processor 160 or in the inserter control computer 118 depending on the computer processing confirmation chosen by one skilled in the art. If hard copy reports are required they also will be updated. If the letter mailpieces are to be processed on a sorter system 159 along with other mail to obtain additional postal authority postage discounts, documentation describing the characteristics for the letter mail will be provided to the sorting operation by the data center processor 160. The flat and letter mailpieces are stacked in their respective stackers 125 and 154. The mailpieces are processed on the inserter in pre-sort delivery point groupings defined by the postal authority. In order to receive postage discounts, the pre-sort delivery point groups must by swept to a correctly labeled tray. This is accomplished by tray break alerts from the inserter control computer 118 and by using pre-printed tray labels or labels printed by a printer 162 for the trays as they are completed. The completed flat mail 128 is delivered to the postal authority 170 for customer delivery. The completed letter mail 158 is either delivered to the postal authority 170 or to a sorting operation 159. Since some portion of the documents will qualify as letter mail, the best postage discounts may only be achieved by combining the letter mailings on a sorter 159.

Figure 2:
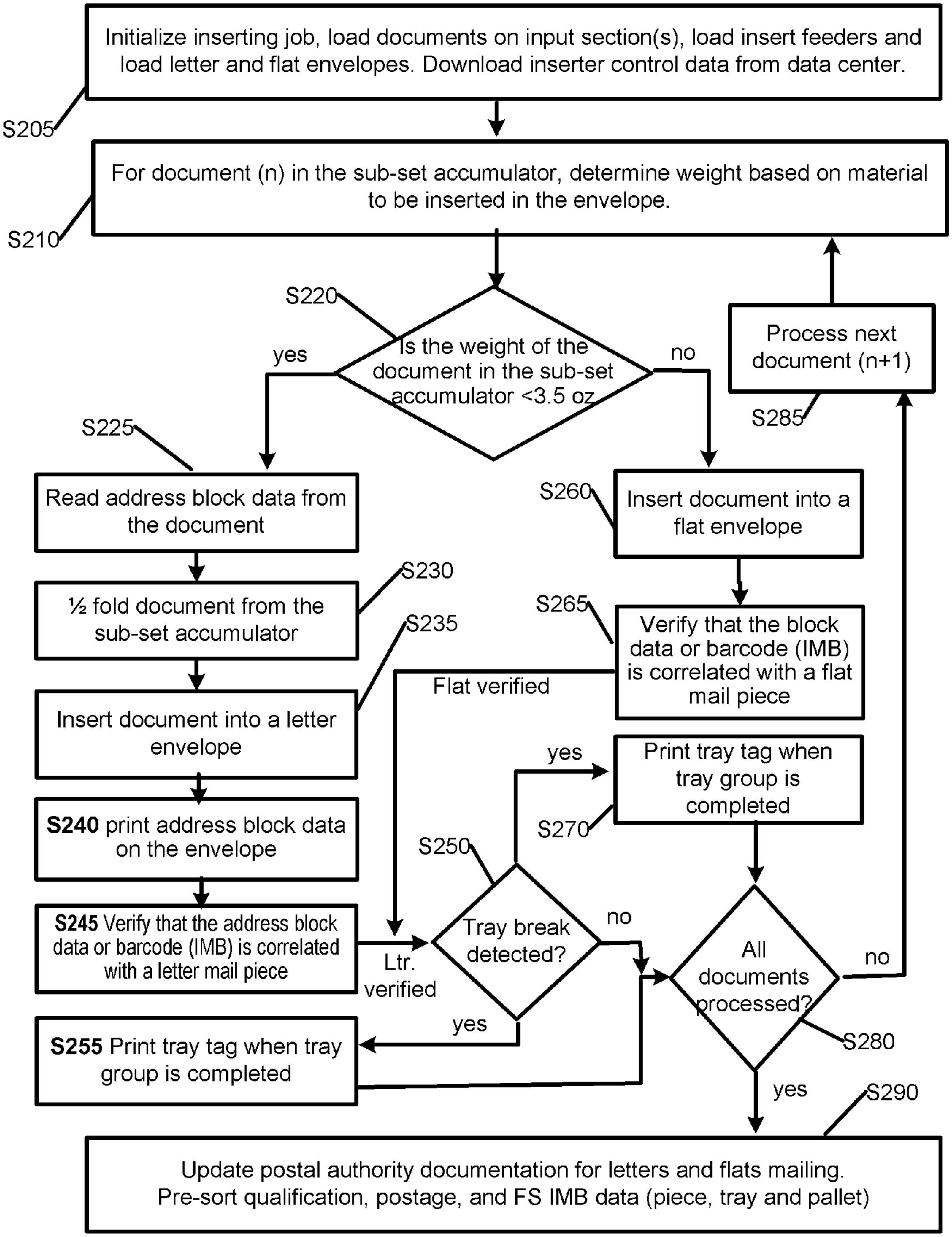
FIG. 2 is an exemplary functional flow diagram for the control and processing steps for a dual letter and flat envelope inserter

The process steps for operation of a dual mode inserter 100 are now discussed based on the illustration in FIG. 2. Inserter job initialization S205 starts with the loading of documents 102 and 104 on to their respective document input sections 106 and 108. Loading inserts into the insert feeders 113 and loading the flat 126 and letter 156 envelopes on to the envelope feeders 126 and 146 respectively. The job control data needs to be downloaded to the inserter control computer 118 from the data center processor 160 under control of the inserter operator. The inserter is then started. When each group of items (referred to as document (n) in the process steps) is received at the sub-set accumulator 116 the weight data is accessed to group of items S210. If the weight is less than 3.5 ounces S220 the document will be processed as a letter. The address block data is read from the document using OCR and barcode reading technology S225. Alternately, the address data can be derived by a reverse lookup of the delivery point data, read from a barcode, in a national directory. In addition, the addressee be read from the mailpiece for verification purposes. An additional option is for the inserter control computer 118 to provide the address and addressee data from the IDF file transferred from the data center processor 160. This association of mailpiece and address data is possible since many inserters have "intelligent" processing that enables tracking of each document in the inserter through each stage of processing. Some configurations will use a barcode reader to read a control The postal authority barcode can also be provided from the inserter control computer 118 or created from the delivery point data. The document is then half folded to make it fit in a 6×9 inch envelope S230 and inserted into the letter envelope S235. Those skilled in the art may choose other letter envelope sizes and fold parameters. An example is, but not limited to, a number 10 envelope and a tri-fold of the document. The address, addressee and delivery point barcode, derived from the imaging system or transferred from the data center processor 160, is printed on the letter envelope S240. Other data incorporated in the address block or appended from other sources maybe printed on the envelope as dictated by the customer or postal authority. Those skilled in the art may specify a document layout that allows the address block data to appear in a windowed letter envelope after the folding and insertion. In order to insure that the correct document was diverted to the letter output section, a verification system must be used to verify the address, addressee and barcode S245. Reading the postal authority barcode, such as the Intelligent Mail® barcode (IMB) maybe sufficient since the IMB has a unique tracking code associated with the barcode which provides positive identification of the mailpiece. If the verification fails, special handling is required which may include stopping the inserter. If a tray break is detected S250, a tray tag is printed which represents the correct pre-sort group and then the mailpieces are swept from the stacker 154 to the tray S255. A check to determine if all the documents in the inserting job is made in step S280. If there are documents still being processed by the inserter, the next document in the sub-set accumulator is processed S285 and control is returned to step S210.

For the case where the document in the sub-set accumulator weighs 3.5 ounces or more S220, the document will be processed as a flat and inserted into a flat envelope S260. In order to insure that the correct document was diverted to the flat output section, a verification system must be used to verify the address and addressee S265. Reading the postal authority barcode, such as the Intelligent Mail® barcode (IMB) maybe sufficient since the IMB has a unique tracking code associated with the barcode which provides positive identification of the mailpiece. If the verification fails, special handling is required which may include stopping the inserter. If a tray break is detected S250, a tray tag is printed which represents the correct pre-sort group and then the mailpieces are swept from the stacker 125 to the tray S270. A check to determine if all the documents in the inserting job is made in step S280. If there are documents still being processed by the inserter, the next document in the sub-set accumulator is processed S285 and control is returned to step S210.

When the inserting job is complete S280, control is transferred to step S290. Mailing documentation is a critical part of an inserting job where the finished mailpieces are to be delivered to the postal authority for processing. Since the original job was planned for flat envelopes, the postal authority documentation must be updated to reflect the new results, which consists of letters and flats. This means that two mailings must be submitted since a single mailing can not contain both flat and letter envelope types. The postal authority documentation may include but is not limited to the pre-sort qualification report, postage summary report and full service IMB reporting. These reports are updated based on the verification data and/or information about the job composition known by the data center processor 160. The documentation associated with the letter mailpieces optionally maybe provided to a sorter since the smaller quantity of letters and additional postage discounts can be achieved by merging the letter mailpieces with mail pieces from other jobs.

Figure 3:
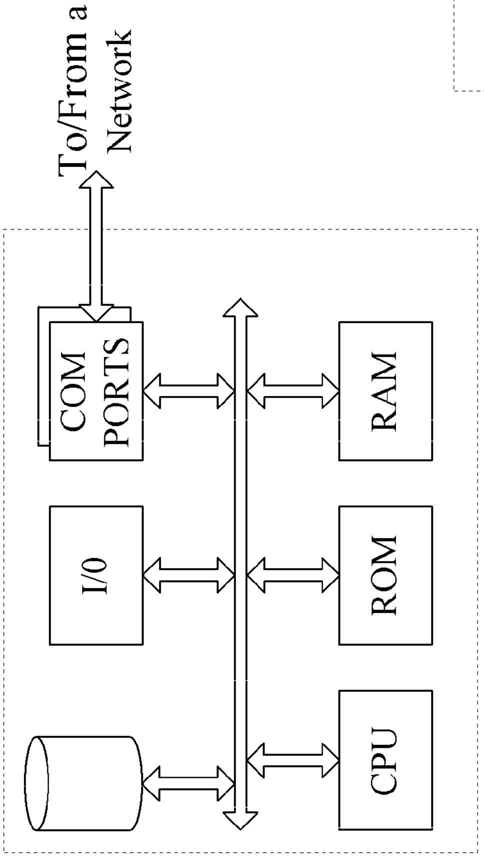
FIG. 3 illustrates a network or host computer platform, as may typically be used to implement a server
Figure 4:
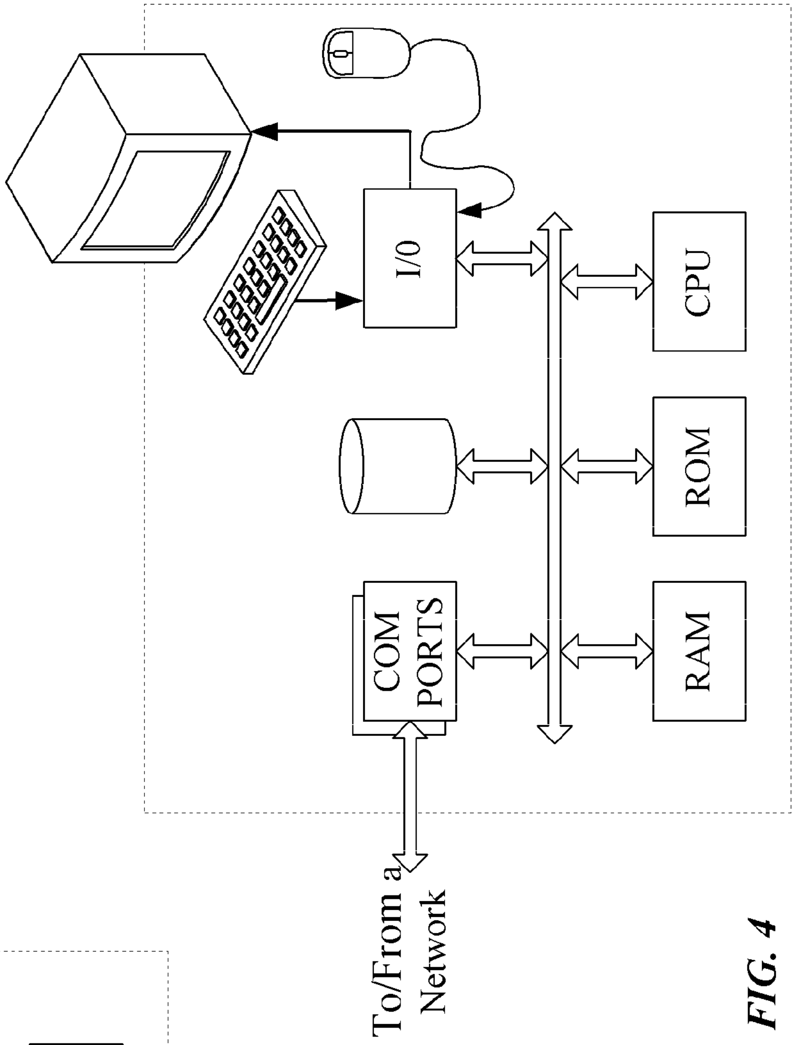
FIG. 4 depicts a computer with user interface elements, as may be used to implement a personal computer or other type of work station or terminal device

FIGS. 3 and 4 provide functional block diagram illustrations of general purpose computer hardware platforms. FIG. 3 illustrates a network or host computer platform, as may typically be used to implement a server. FIG. 4 depicts a computer with user interface elements, as may be used to implement a personal computer or other type of work station or terminal device, although the computer of FIG. 4 may also act as a server if appropriately programmed. It is believed that those skilled in the art are familiar with the structure, programming and general operation of such computer equipment and, as a result, the drawings should be self-explanatory.

For example, control computer 118 may be a PC based implementation of a central control processing system like that of FIG. 4, or may be implemented on a platform configured as a central or host computer or server like that of FIG. 3. Such a system typically contains a central processing unit (CPU), memories and an interconnect bus. The CPU may contain a single microprocessor (e.g. a Pentium microprocessor), or it may contain a plurality of microprocessors for configuring the CPU as a multi-processor system. The memories include a main memory, such as a dynamic random access memory (DRAM) and cache, as well as a read only memory, such as a PROM, an EPROM, a FLASH-EPROM or the like. The system memories also include one or more mass storage devices such as various disk drives, tape drives, etc.

In operation, the main memory stores at least portions of instructions for execution by the CPU and data for processing in accord with the executed instructions, for example, as uploaded from mass storage. The mass storage may include one or more magnetic disk or tape drives or optical disk drives, for storing data and instructions for use by CPU. For example, at least one mass storage system in the form of a disk drive or tape drive, stores the operating system and various application software as well as data, such as sort scheme instructions and image data. The mass storage within the computer system may also include one or more drives for various portable media, such as a floppy disk, a compact disc read only memory (CD-ROM), or an integrated circuit non-volatile memory adapter (i.e. PC-MCIA adapter) to input and output data and code to and from the computer system.

The system also includes one or more input/output interfaces for communications, shown by way of example as an interface for data communications with one or more other processing systems. Although not shown, one or more such interfaces may enable communications via a network, e.g., to enable sending and receiving instructions electronically. The physical communication links may be optical, wired, or wireless.

The computer system may further include appropriate input/output ports for interconnection with a display and a keyboard serving as the respective user interface for the processor/controller. For example, a printer control computer in a document factory may include a graphics subsystem to drive the output display. The output display, for example, may include a cathode ray tube (CRT) display, or a liquid crystal display (LCD) or other type of display device. The input control devices for such an implementation of the system would include the keyboard for inputting alphanumeric and other key information. The input control devices for the system may further include a cursor control device (not shown), such as a mouse, a touchpad, a trackball, stylus, or cursor direction keys. The links of the peripherals to the system may be wired connections or use wireless communications.

The computer system runs a variety of applications programs and stores data, enabling one or more interactions via the user interface provided, and/or over a network to implement the desired processing, in this case, including those for processing document data as discussed above.

The components contained in the computer system are those typically found in general purpose computer systems. Although summarized in the discussion above mainly as a PC type implementation, those skilled in the art will recognize that the class of applicable computer systems also encompasses systems used as host computers, servers, workstations, network terminals, and the like. In fact, these components are intended to represent a broad category of such computer components that are well known in the art. The present examples are not limited to any one network or computing infrastructure model—i.e., peer-to-peer, client server, distributed, etc.

Hence aspects of the techniques discussed herein encompass hardware and programmed equipment for controlling the relevant document processing as well as software programming, for controlling the relevant functions. A software or program product, which may be referred to as an "article of manufacture" may take the form of code or executable instructions for causing a computer or other programmable equipment to perform the relevant data processing steps regarding document printing and associated imaging and print quality verification, where the code or instructions are carried by or otherwise embodied in a medium readable by a computer or other machine. Instructions or code for implementing such operations may be in the form of computer instruction in any form (e.g., source code, object code, interpreted code, etc.) stored in or carried by any readable medium.

Such a program article or product therefore takes the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the relevant software from one computer or processor into another, for example, from a management server or host computer into the image processor and comparator. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer (s) or the like, such as may be used to implement the sorting control and attendant mail item tracking based on unique mail item identifier. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for processing a plurality of mail documents on a dual mode inserter, the method comprising steps of:

receiving a plurality of mail documents at an input section of the dual mode inserter;

determining a weight of a first mail document and second mail document, the weight of the first mail document being less than the weight of the second mail document;

without stoppage of the dual mode inserter, diverting the first mail document to a letter output system and the second mail document to a flat output system based on respective weight of the first and second mail documents;

inserting the second mail document into a flat envelope;

obtaining the address data from the first mail document;

folding the first mail document; and inserting the folded first mail document into a letter envelope.

2. The method of claim 1, further comprising the step of: obtaining the address data from at least an insertion definition file, data referenced for a barcode reference number or from an imaging system that read the address from the document.

3. The method of claim 1, further comprising the step of: printing the address data on the letter envelope.

4. The method of claim 3, further comprising the step of: verifying that the address intended to be printed on the first mail document letter envelope was correctly printed based on the printed address data read from the envelope.

5. The method of claim 4, wherein the printed address data includes a block address data and/or a postal authority approved barcode.

6. The method of claim 1, further comprising the step of: verifying address data of the second mail document is associated with a flat mailing.

7. The method of claim 6, further comprising the step of: printing a tray tag upon processing a plurality of flat envelope mailings associated with a tray group and printing a tray tag upon processing a plurality of letter envelope mailings associated with a tray group.

8. The method of claim 1, further comprising the step of: updating postal authority documentation from the original mailing to represent letter and flat mailings.

9. A method for processing a plurality of mail documents on a dual mode inserter, the method comprising steps of:

loading a plurality of mail documents at an input end of the dual mode inserter;

accessing job control information for each mail document, the job control information being in an electronic format and including at least one of weight, page count or address data associated with each mail document;

without stoppage of the dual mode inserter, diverting a first mail document to a letter output system and a second mail document to a flat output system based on the accessed weight data of the first and second mail documents, the weight of the first mail document being less than the weight of the second mail document;

inserting the first mail document into a letter envelope and the second mail document into a flat envelope; and forwarding updated postal authority documentation from the original mailing to represent letter and flat mailings.

10. The method of claim 9, further comprising the step of: printing the address data on the letter envelope.

11. The method of claim 10, further comprising the step of: verifying that the address intended to be printed on the first mail document letter envelope was correctly printed based on the printed address data read from the envelope.

12. The method of claim 11, wherein the printed address includes a block address data and/or a postal authority approved barcode.

13. The method of claim 9, further comprising the step of: verifying address data of the second mail document is associated with a flat mailing.

14. The method of claim 13, further comprising the step of: printing a tray tag upon processing a plurality of letter envelope mailings associated with a tray group.

15. The method of claim 9, further comprising the step of: accessing control information from at least an electric file format, referenced form barcode data or read directly from barcode data.

16. A dual mode inserter system, the system comprising:

an input section configured to receive a plurality of mail documents;

a transport path for conveying the plurality of mail documents;

a controller configured to determine a weight of a first mail document and second mail document; and a sub-set accumulator configured to divert the first mail document to a letter output system and the second mail document to a flat output system based on respective weight of the first and second mail documents, wherein the weight of the second mail document is greater than the first mail document, wherein the letter output system includes at least an address or barcode reader for reading data from a mail document and a printer for printing address information on an envelope.

17. The dual mode inserter system according to claim 16, further comprising a data center processor for forwarding updated mailing documentation to a postal authority.

18. The dual mode inserter system according to claim 16, wherein the letter output system further includes:

a folder for folding each document prior to insertion into a letter envelope;

an inserter for inserting folded documents into a letter envelope.

19. The dual mode inserter system according to claim 16, wherein the transport path is configured to receive one or more inserts to be collated with a respective mail document.

20. The dual mode inserter system according to claim 16, wherein the flat output system comprises one or more of:

a flat envelope feeder;

an inserter for inserting the second mail document into a flat envelope;

a verification system configured to update or create postal authority mailing documentation; and a flat envelope stacker.

* * * * *

UNITED STATES PATENT AND TRADEMARK OFFICE

CERTIFICATE OF CORRECTION

PATENT NO. : 8,028,982 B2
APPLICATION NO. : 12/534485
DATED : October 4, 2011
INVENTOR(S) : Mark Van Gorp et al.

It is certified that error appears in the above-identified patent and that said Letters Patent is hereby corrected as shown below:

On the Title Page:

Item (12) United States Patent should read Van Gorp et al. instead of Gorp et al.

Signed and Sealed this
Fourth Day of June, 2013

Teresa Stanek Rea
*Acting Director of the United States Patent and Trademark Office*